UNITED STATES PATENT OFFICE.

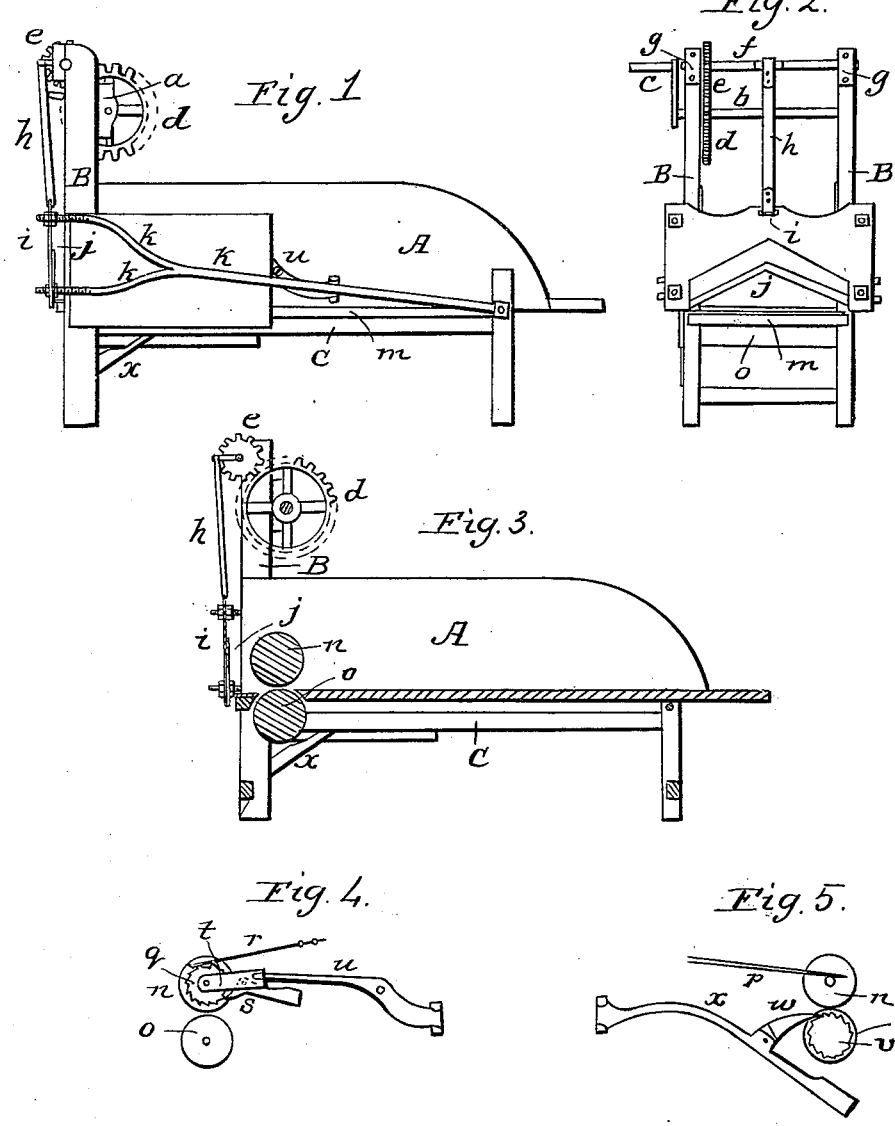

LEWIS TUPPER, OF AUBURN, NEW YORK.

STRAW-CUTTER.

Specification of Letters Patent No. 6,678, dated August 28, 1849.

*To all whom it may concern:*

Be it known that I, LEWIS TUPPER, of Auburn, of the county of Cayuga and State of New York, have invented a new and useful Improvement on a Straw-Cutting Machine; and I do hereby declare that the following is a full and accurate description thereof, reference being had to the annexed drawings, making a part of this specification of which—

Figure 1 is a side elevation of the machine. Fig. 2 is a vertical, longitudinal section. Fig. 3 is a front section view. Fig. 4 is a side view of a ratchet wheel and operating lever on one side of the machine. Fig. 5 is a side view of ratchet wheel and lever on the opposite side of the machine.

Similar letters of reference indicate the same parts.

The nature of my invention consists of the arrangement of two long lever rods, on opposite sides of the straw cutting machine, in combination with levers and clicks that operate on ratchet wheels on the ends of the feeders or rollers for carrying the straw or hay forward under the knife, in the operation of cutting, the straw or hay being cut off in equal lengths by a knife that slides vertically and is moved by a crank in gear with it.

To enable others to understand and use my invention, I will proceed to describe its construction and operation.

I make my straw cutter in the usual form of such machines, A, being one of the sides, B, B, the two standards in front, and, C, the side beam of the frame, as shown in Figs. 1, 2 and 3. The standards, B, B, are carried up some distance above the top of the machine, and on the upper and back part of them are bearings, $a$ $a$, which support a shaft, $b$, that lies across the straw cutter, on one end of which shaft is a crank, $c$, and also, close to the inner side of the right hand standard, a cog-wheel, $d$, which gears into a smaller cog-wheel, $e$, on an elbowed shaft, $f$, supported on bearings $g$, $g$, on the front of the standards, B, B, placed above the bearings, $a$, $a$. Attached to the elbow of this shaft, $f$, which is in the center of it, is a connecting rod, $h$, by which is suspended a plate, $i$, to which is secured the cutting knife, $j$, in the manner hereinafter described, and as shown in Figs. 1, 2 and 3.

On both sides of the machine are two long lever rods, K, K, (one only of which is shown in Fig. 1,) that lie lengthwise and work on pivots at the hind end of the machine, and are divided into forks, $k$, $k$, at the fore end, which forks have screws cut upon them that fasten by taps to the plate, $i$, and the knife, $j$, securing them firmly to each other.

Above and below the floor or bed, $m$, of the machine, are two rollers, $n$, and $o$, which lie cross-wise and are arranged in the ordinary way as feeders. The axis of the upper roller, $n$, slides in vertical grooves or slots at both ends, to allow more or less straw to pass under it, and fastened on a pivot at one end to the side of the machine, is a spring $p$, which bears upon the axis and presses the roller down upon the straw beneath it, as it passes, and as shown in Fig. 5. At the other side, on one end of the roller, $n$, is a ratchet wheel, $q$, as shown in Fig. 4, on the top of which bears a spring, $r$, also fastened on a pivot at one end to the side of the machine, having a claw point which catches in the teeth of the ratchet wheel and performs the double office of preventing the said wheel from turning but in one direction and of bearing down the roller, $n$, simultaneously with the spring $p$.

The ratchet wheel, $q$, is worked by a click, $s$, on the under side, which pivots on an arm, $t$, that is fastened to the axis of the roller, $n$, and is connected with an elbow lever, $u$, which is attached to the side, A, and has a clutch upon its free end that grapples and slides upon the rod, K. On the opposite side of the machine is another ratchet wheel, $v$, as shown in Fig. 5, on the end of the lower roller, $o$, which is operated by a click, $w$, jointed to a lever, $x$, which lever is fastened at one end to the lower part of the standard, B, and on the other end has a clutch that grapples and slides on the rod, K, in the same manner that the clutch on the lever, $u$, does on the rod on the opposite side. The said ratchet wheels and clicks and portions of the levers are covered by plates, as shown in Fig. 1.

Having thus described the construction of my straw cutting machine, I will now describe its operation. By turning the crank, $c$, motion is given through the cog-wheels, $d$, and $e$, to the shaft $f$, which by means of the elbow on it and the connecting rod $h$ moves the cutting knife, $j$, up and down, and at the same time works the lever rods, K, K, which by their vibrating movement operate on the levers *u* and *x* the clutches on the ends of which bear and slide upon them, thus giving a rotary motion to the ratchet wheels, *q* and *v*, and the rollers, *n*, and *o*, in opposite directions. The straw being put in the box the operation of the cutting is evident.

Having thus described my invention, I claim—

The combination of the reciprocating arms K, K, with the ratchet levers or clicks *u* and *w*, in the manner substantially as described and for the purposes set forth.

LEWIS TUPPER.

Witnesses:
HARVEY L. TUPPER,
GEORGE M. TUPPER.